(12) United States Patent
Song (10) Patent No.: US 11,669,931 B2
(45) Date of Patent: Jun. 6, 2023

(54) DEVICE AND METHOD FOR INSERTING IDENTIFICATION CODE FOR TRACKING DUPLICATED IMAGE

(71) Applicant: DATAKOBOLD CO., LTD., Seongnam-si (KR)

(72) Inventor: Nam Goo Song, Suwon-si (KR)

(73) Assignee: DATAKOBOLD CO., LTD., Seongnam-si (KR)

( * ) Notice: Subject to any disclaimer, the term of this patent is extended or adjusted under 35 U.S.C. 154(b) by 247 days.

(21) Appl. No.: 17/230,153

(22) Filed: Apr. 14, 2021

(65) Prior Publication Data

US 2021/0233201 A1    Jul. 29, 2021

Related U.S. Application Data

(63) Continuation of application No. PCT/KR2019/013667, filed on Oct. 17, 2019.

(30) Foreign Application Priority Data

Nov. 22, 2018   (KR) .................. 10-2018-0145413

(51) Int. Cl.
*G06T 1/00* (2006.01)
*G06F 21/16* (2013.01)

(52) U.S. Cl.
CPC ............. *G06T 1/005* (2013.01); *G06F 21/16* (2013.01); *G06T 2201/0062* (2013.01); *G06T 2201/0063* (2013.01); *G06T 2201/0064* (2013.01)

(58) Field of Classification Search
CPC ............. G06T 1/005; G06T 2201/0062; G06T 2201/0063; G06T 2201/0064; G06T 2201/0081; G06T 1/0028; G06T 1/0021; G06F 21/16; H04N 1/32; H04N 1/32144; H04N 1/32267; H04N 1/32101; H04N 1/32229

See application file for complete search history.

(56) References Cited

U.S. PATENT DOCUMENTS

2019/0354658 A1* 11/2019 Lee .................... G06Q 20/1235

FOREIGN PATENT DOCUMENTS

JP         2003179746 A     6/2003
KR      1020050096259 A    10/2005
(Continued)

OTHER PUBLICATIONS

International Search Report of PCT/KR2019/013667 dated Jan. 28, 2020.

*Primary Examiner* — Christopher Wait
(74) *Attorney, Agent, or Firm* — Dinsmore & Shohl LLP; Yongsok Choi, Esq.

(57) ABSTRACT

The present disclosure a method of providing identification code insertion service for tracking a duplicated image, which is performed by a server, including: (a) receiving an image from a user terminal; (b) converting the received image to black and white, and selecting a plurality of insertion regions in the converted image; (c) transforming an image of at least one of a plurality of insertion regions selected at random; and (d) mapping an identification code and image information included in the transformed image of the insertion region, storing the identification code and the image information in a database, and providing the image in which the identification code is inserted to the user terminal.

10 Claims, 6 Drawing Sheets

(56) References Cited

FOREIGN PATENT DOCUMENTS

| KR | 1020050107153 A | 11/2005 |
| KR | 1020180089272 A | 8/2018 |
| KR | 1020180116628 A | 10/2018 |

* cited by examiner

DEVICE AND METHOD FOR INSERTING IDENTIFICATION CODE FOR TRACKING DUPLICATED IMAGE

CROSS-REFERENCE TO RELATED APPLICATIONS

This application is a continuation of PCT Application No. PCT/KR2019/013667 filed on Oct. 17, 2019 in the Korean Intellectual Property Office which claims the benefit under 35 USC 119(a) of Korean Patent Application No. 10-2018-0145413 filed on Nov. 22, 2018, the entire disclosures of which are incorporated herein by reference for all purposes.

BACKGROUND

1. Technical Field

The present disclosure relates to an apparatus and a method for tracking when an image is duplicated by inserting an identification code into an image.

2. Related Art

Webtoon is a new word created by combining web of the Internet and cartoon of a comic, and refers to a comic that is serialized on the Internet through effects of various multimedia.

With a recent growth of a webtoon market, there is a problem that copyright infringement and economic loss are caused by unauthorized copying and posting of webtoon images.

In the related art, a watermark is inserted into an image so that a person concerned about illegal copying may check it with the naked eye, but there is a vulnerability in that the watermark may be bypassed by deleting the watermark or altering the image.

Therefore, there is an urgent need for a technology to improve the vulnerability of the watermark of the related art.

SUMMARY

The present disclosure is provided to solve the above-described problems of the related art, and an object of the present disclosure is to generate an identification code that is difficult to identify with the naked eye and insert the identification code into a specific region of an image according to a predetermined algorithm.

However, the technical problem to be solved by the present example is not limited to the technical problems as described above, and other technical problems may exist.

As technical means for solving the technical problems described above, according to an example of the present disclosure, there is provided a method of providing identification code insertion service for tracking a duplicated image, which is performed by a server, including: (a) a step of receiving an image from a user terminal; (b) a step of converting the received image to black and white, and selecting a plurality of insertion regions; (c) a step of transforming an image of at least one of a plurality of insertion regions selected at random; and (d) a step of mapping an identification code and image information included in the transformed image of the insertion region, storing the identification code and the image information in a database, and providing the image into which the identification code is inserted, to the user terminal. The insertion region refers to a region constituted of at least one pixel among pixels constituting the image. The identification code is generated by transforming a binary code of a predetermined size included in a finally selected insertion region.

Another example for solving the technical problems described above is an apparatus of providing identification code insertion service for tracking a duplicated image, including: a memory in which a program that provides the identification code insertion service for tracking the duplicated image is stored; and a processor that executes a program stored in the memory to provide the identification code insertion service for tracking the duplicated image. The process receives an image from a user terminal; converts the received image to black and white, and selects a plurality of insertion regions; transforms an image of at least one of a plurality of insertion regions selected at random; and maps an identification code and image information included in the transformed image of the insertion region, stores the identification code and the image information in a database, and provides the image into which the identification code is inserted, to the user terminal.

According to an example of the present disclosure, an identification code that is difficult to identify with the naked eye may be generated and inserted into a specific region of an image according to a predetermined algorithm.

Since the identification code inserted into the image is difficult to check with the naked eye, it is difficult for other users to alter or delete the identification code included in the image. Through this, it is possible to more easily track a case where an image is illegally copied or stolen compared to the watermark technology of the related art.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Hereinafter, examples of the present disclosure will be described in detail with reference to the accompanying drawings so that those of ordinary skill in the art may easily implement the present disclosure. However, the present disclosure may be implemented in various different forms, and is not limited to the examples described herein. In the drawings, portions irrelevant to the description are omitted in order to clearly describe the present disclosure, and similar reference numerals are attached to similar portions throughout the specification.

Throughout the specification, when a portion is said to be "connected" with another portion, this includes not only "directly connected" but also "electrically connected" with another element in the middle. In addition, when a portion "includes" a certain configuration element, it means that other configuration elements may be further included rather than excluding the other configuration elements unless specifically stated to the contrary.

The following examples are detailed descriptions for aiding understanding of the present disclosure, and do not limit the scope of the present disclosure. Therefore, the disclosure of the same scope performing the same function as the present disclosure will also belong to the scope of the present disclosure.

Throughout the specification, a server 100 may be an apparatus that provides identification code insertion service for tracking a duplicated image.

Figure 1:
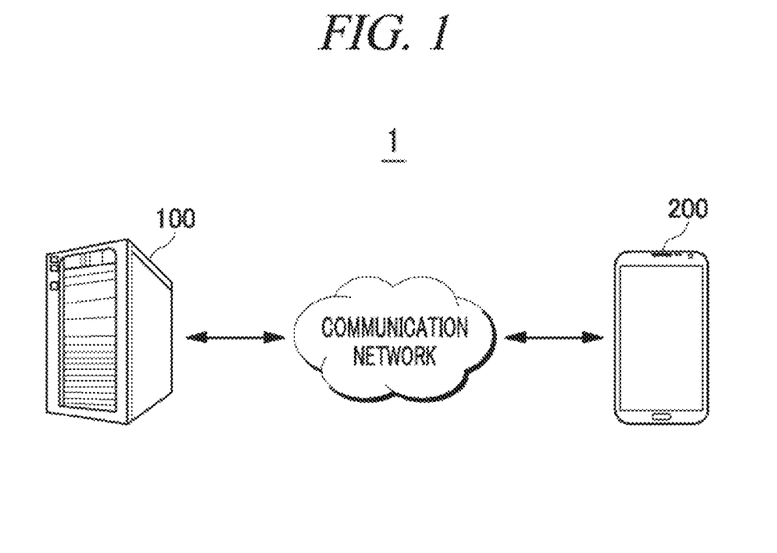
FIG. 1 is a diagram illustrating a configuration of a system that provides identification code insertion service for tracking a duplicated image according to an example of the present disclosure.

FIG. 1 is a diagram illustrating a configuration of a system that provides the identification code insertion service for tracking the duplicated image according to an example of the present disclosure.

Referring to FIG. 1, the system 1 that provides the identification code insertion service for tracking the duplicated image according to an example of the present disclosure includes the server 100 and a user terminal 200. In addition, the system 1 includes a communication network interconnecting the server 100 and the user terminal 200.

According to an example of the present disclosure, the server 100 selects a plurality of insertion regions where identification codes are inserted into images received from the user terminal 200, and randomly selects at least one or more of the insertion regions to transform the image of the insertion region.

In addition, image information, an identification code, and the like included in the image are mapped, stored in a database, and provided to the user terminal 200.

At this time, the insertion region refers to a region constituted of at least one pixel among pixels constituting the image, and the identification code refers that a binary code of a predetermined size included in a finally selected insertion region is transformed and generated.

The user terminal 200 may refer to a terminal used by a producer who produced an image in the present disclosure, and may upload the produced image to the server 100 or download a transformed image into which the identification code is inserted.

In addition, when a problem such as theft or duplication of an image occurs, it is used to receive information on the problem.

An application providing the identification code insertion service for tracking the duplicated image may be an application embedded in the user terminal 200 or an application downloaded from an application distribution server and installed in the user terminal 200.

User terminals 200 refer to communication terminals that may use terminal applications in a wired or wireless communication environment. Here, the user terminal 200 may be a portable terminal of the user. In FIG. 1, the user terminal 200 is illustrated as a smart phone, which is a kind of a portable terminal, but the spirit of the present disclosure is not limited thereto, and as described above, a terminal on which a terminal application is capable of being mounted may be borrowed without limitation.

To explain this in more detail, the user terminal 200 may include a handheld computing device (for example, a PDA, an email client, or the like), any form of a mobile phone, or any form of another kind of computing or communication platform. However, the present disclosure is not limited thereto.

Meanwhile, the communication network serves to connect the server 100 and the user terminal 200. That is, the communication network refers to a communication network that provides an access path so that the user terminal 200 may transmit and receive data after accessing the server 100. The communication network includes, for example, a wired network such as LANs (Local region Networks), WANs (Wide region Networks), MANs (Metropolita region Networks), ISDNs (Integrated Service Digital Networks), and wireless networks such as wireless LANs, CDMA, Bluetooth, and satellite communications. However, the scope of the present disclosure is not limited thereto.

Figure 2:
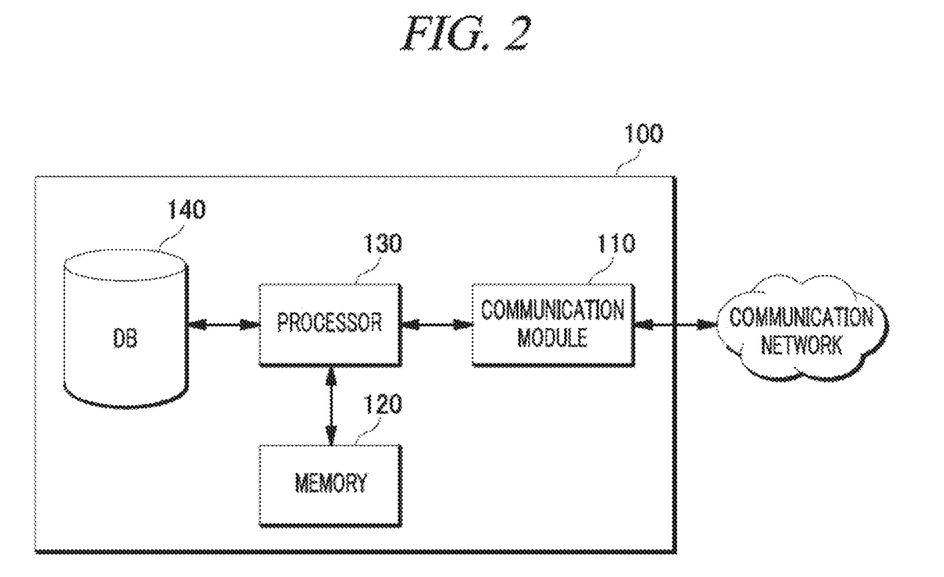
FIG. 2 is a diagram illustrating a configuration of a server according to an example of the present disclosure.

FIG. 2 is a diagram illustrating the configuration of the server according to an example of the present disclosure.

Referring to FIG. 2, the server 100 includes a communication module 110, a memory 120, a processor 130, and a database 140.

Specifically, the communication module 110 provides a communication interface necessary for providing a transmission/reception signal between the server 100 and the user terminal 200 in a form of packet data in connection with a communication network. Furthermore, the communication module 110 may serve to receive data requests from terminals and transmit data as a response thereto.

Here, the communication module 110 may be a device including hardware and software necessary for transmitting and receiving a signal such as a control signal or a data signal through a wired or wireless connection with another network device.

In the memory 120, a program for performing a method of providing the identification code insertion service for tracking a duplicated image is recorded. In addition, the memory 120 performs a function of temporarily or permanently storing data processed by the processor 130. Here, the memory 120 may include magnetic storage media or flash storage media, but the scope of the present disclosure is not limited thereto.

The processor 130 is a kind of central processing unit and controls entire processing of providing the identification code insertion service for tracking the duplicated image. Each step performed by the processor 130 will be described later with reference to FIGS. 3 and 4.

Here, the processor 130 may include all types of devices capable of processing data, such as a processor. Here, the 'processor' may refer to a data processing device embedded in hardware, which has a circuit physically structured to perform a function represented by a code or instructions included in a program. As described above, an example of the data processing device built into hardware includes a processing device such as a microprocessor, a central processing unit (CPU), a processor core, a multiprocessor, an application-specific integrated circuit (ASIC), or a field programmable gate array (FPGA), but the scope of the present disclosure is not limited thereto.

The database 140 may store image information received from the user terminal 200 and the position, the size, and the binary code of the insertion region into which the identification code of the image is inserted. The position where the identification code is inserted, the size, and the transformed binary code may be mapped together and stored.

In this case, the image information may include at least one or more of a unique identifier, a title, related image information, an image generation time, and personal information of the producer included in the image.

Although not illustrated in FIG. 2, some of the image information or information on the identification code may be stored in a database (not illustrated) that is physically or conceptually separated from the database 140.

Figure 3:
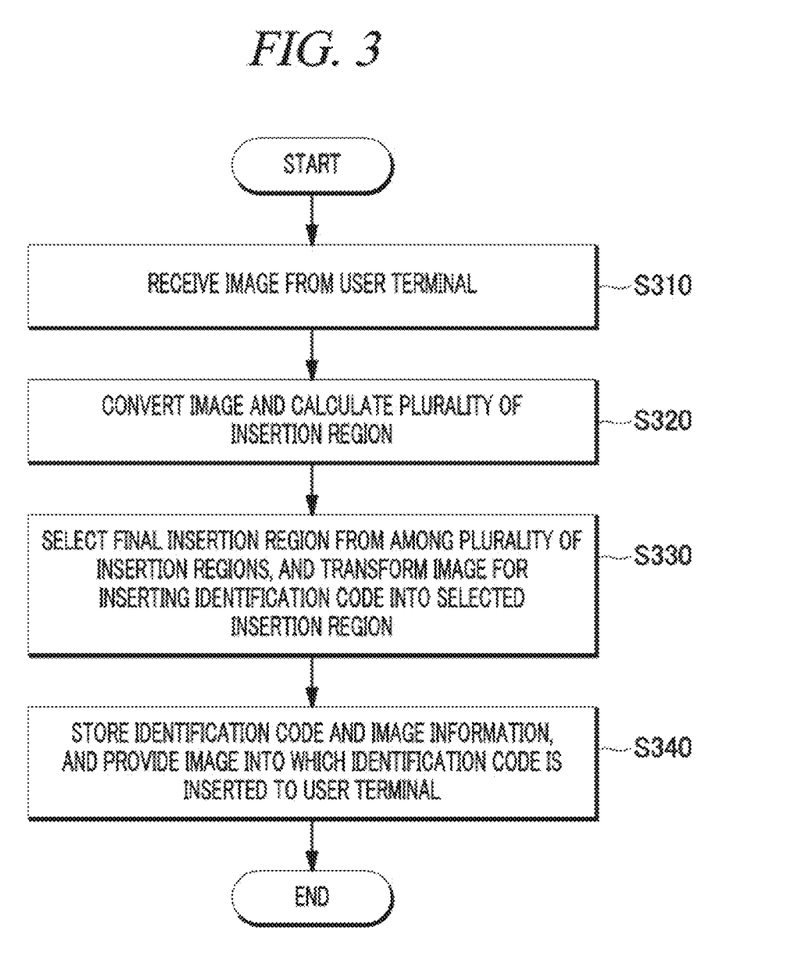
FIG. 3 is an operation flowchart illustrating a method of providing the identification code insertion service for tracking the duplicated image, which is performed by a server according to an example of the present disclosure.

FIG. 3 is an operation flowchart illustrating a method of providing the identification code insertion service for tracking the duplicated image performed by the server 100 according to an example of the present disclosure.

Referring to FIG. 3, an image is received from the user terminal 200 (S310), and a conversion of the received image and a plurality of insertion regions are calculated (S320).

Here, the plurality of insertion regions are calculated based on an image region having a difference or more in a predetermined binary value through an edge detection algorithm.

In addition, in order to measure the difference in the distinct binary value, the image is converted to black and white, and an additional change such as dividing the size of the image may be made if necessary.

In this case, the calculated insertion region is selected excluding an image region including characters.

A final insertion region is selected from among the plurality of insertion regions, and image transformation for inserting an identification code into the selected insertion region is performed (S330).

The final insertion region is randomly selected from among the plurality of insertion regions to select at least one or more. In general, one identification code may be inserted, but a plurality of insertion regions may be selected according to the size of the image or the number of cuts.

At this time, the image of the selected final insertion region is transformed to insert the identification code into the image.

As a further example, a method of inserting a separately generated identification code after deleting the image of the selected final insertion region by mapping to the position and the size of the identification code may be used.

In this case, processing of generating the identification code will be described later with reference to FIG. 4.

Finally, when the insertion of the identification code into the image is completed, the identification code and image information are stored, and the image into which the identification code is inserted is provided to the user terminal 200 (S340).

In detail, the identification code and image information included in the image of the transformed insertion region are mapped and stored together in the database 140 of the server 100. The image into which the identification code is inserted is provided to the user terminal 200.

Here, the image information is information including at least one more of a unique identifier, a title, related image information, an image generation time, and personal information of the producer included in the image.

After step S340, the server 100 tracks the copying or unauthorized theft of the image through a method described below.

As a first method, when someone performs an action to copy an image being used on a web such as the Internet, a method of detecting and tracking the action may be used by the server 100.

First, in a case where a signal for copying a specific image is issued from an arbitrary terminal, the server 100 may receive identification information of an arbitrary terminal or user account information associated with an arbitrary terminal.

For example, in a case where an arbitrary terminal attempts to copy or steal a specific image into which an identification code is inserted, the server 100 automatically receives information on a serial number, a mac address, an ip, and a phone number of the terminal, or information on the user.

In this way, the identification information on an arbitrary terminal or the user account information received from the arbitrary terminal is associated with a specific image and stored in the server 100.

A second method may be a method of recognizing an image being used by an external server or an external terminal and determining whether the image is copied or stolen.

First, the server 100 receives an arbitrary image from unauthorized external server and external terminal, and determines whether an identification code extracted from the arbitrary image matches with an identification code of a specific image stored in advance.

In a case where there is a matching result, a function of notifying a predetermined administrator terminal or the user terminal 200 of the matching result by considering the identification information or the user account information of a terminal associated with the specific image according to the matching result as a replication target may be provided.

As a further example, although the server 100 may directly receive an image from the unauthorized external server or external terminal, the image may be received through a method such as a report from the administrator terminal or the user terminal 200.

Figure 4:
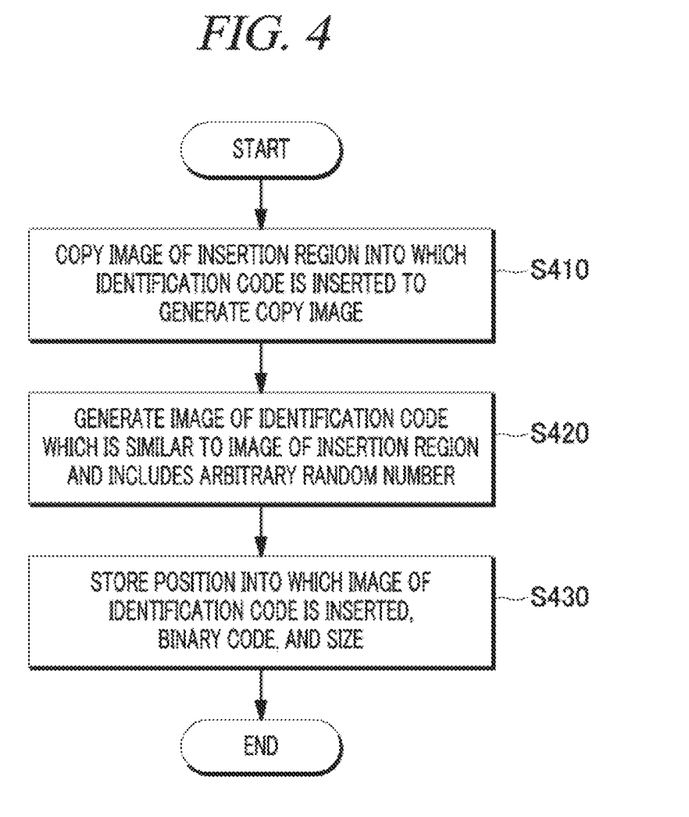
FIG. 4 is an operation flowchart illustrating processing of generating an identification code according to an example of the present disclosure.

FIG. 4 is an operation flowchart illustrating processing of generating the identification code according to an example of the present disclosure.

Referring to FIG. 4, the server 100 copies an image of an insertion region into which the identification code is inserted to generate a copy image (S410).

At this time, not only the copy image, but also the positions, the binary codes, and the sizes of the plurality of insertion regions calculated through step S320 are temporarily stored, and the positions of the plurality of insertion regions are set based on coordinates of x and y axes.

In addition, the generated copy image may be used later to restore the image into which the identification code is inserted, to an original state.

An image of an identification code which is similar to the image of the insertion region and includes an arbitrary random number is generated (S420).

To explain this in detail, the image of the identification code including the arbitrary random number while having a form of a predetermined similarity or higher than that compared with the copy image generated in step S410 according to a predetermined image generation algorithm is generated.

At this time, the image including the identification code may be used by replacing the image generated by the user.

The position into which the image of the identification code is inserted, the binary code, and the size are stored (S430).

At this time, the position of the identification code is set based on the coordinates of the x and y axes, and the size matches with the size of the selected final insertion region.

In a further example, the position into which the generated identification code is inserted and the size thereof may be randomly changed according to a request of the user, and in this case, a size or a position different from that of the previously applied identification code is provided.

FIG. 5A to FIG. 5D are an exemplary view illustrating processing of selecting the insertion region in the image according to an example of the present disclosure.

Figure 5A:
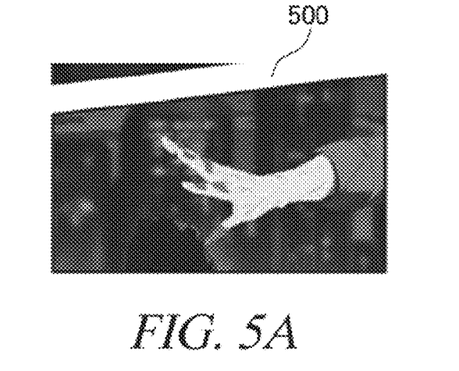
FIG. 5A is an exemplary view illustrating processing of selecting an insertion region in an image according to an example of the present disclosure.
Figure 5B:
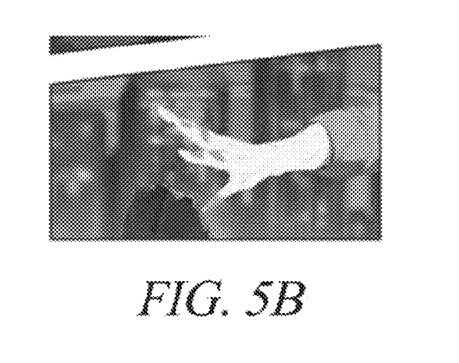
FIG. 5B is an exemplary view illustrating processing of selecting an insertion region in an image according to an example of the present disclosure.
Figure 5C:
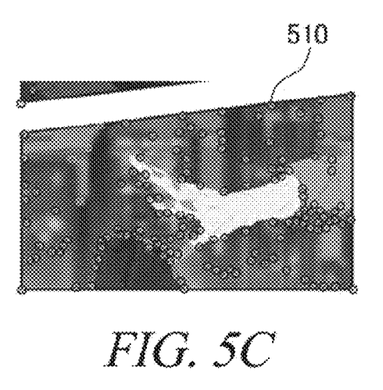
FIG. 5C is an exemplary view illustrating processing of selecting an insertion region in an image according to an example of the present disclosure.
Figure 5D:
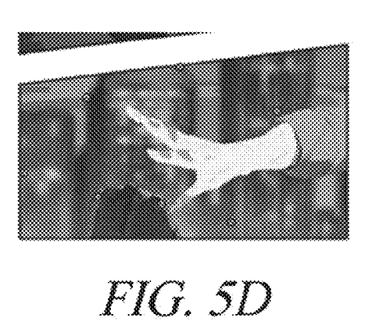
FIG. 5D is an exemplary view illustrating processing of selecting an insertion region in an image according to an example of the present disclosure.

Referring to FIG. 5A to FIG. 5D, an image 500 and an insertion region 510 may be seen in FIG. 5A and FIG. 5B. At this time, each image illustrated in FIG. 5A to FIG. 5D are illustrated in black and white, but according to an example of the present disclosure, the FIG. 5A, FIG. 5C, and FIG. 5D are expressed in color, the FIG. 5B may be an image expressed in black and white.

The FIG. 5A may be an example of the original image 500 received from the producer.

The FIG. 5B may be an example of changing the image 500 to black and white in order to detect a difference in the binary value through the edge detection algorithm.

This is because in a case where the original image 500 is used, the binary value detected due to various colors is wide, the color is transformed into black and white to reduce the various colors.

In the FIG. 5C, a plurality of insertion regions 510 detected in the image 500 may be checked, and an example of selecting the insertion region 510 into which the identification code is to be inserted through random selection may be the FIG. 5D.

In this case, as described above, there may be at least one or a plurality of insertion regions 510 that are finally inserted.

Figure 6:
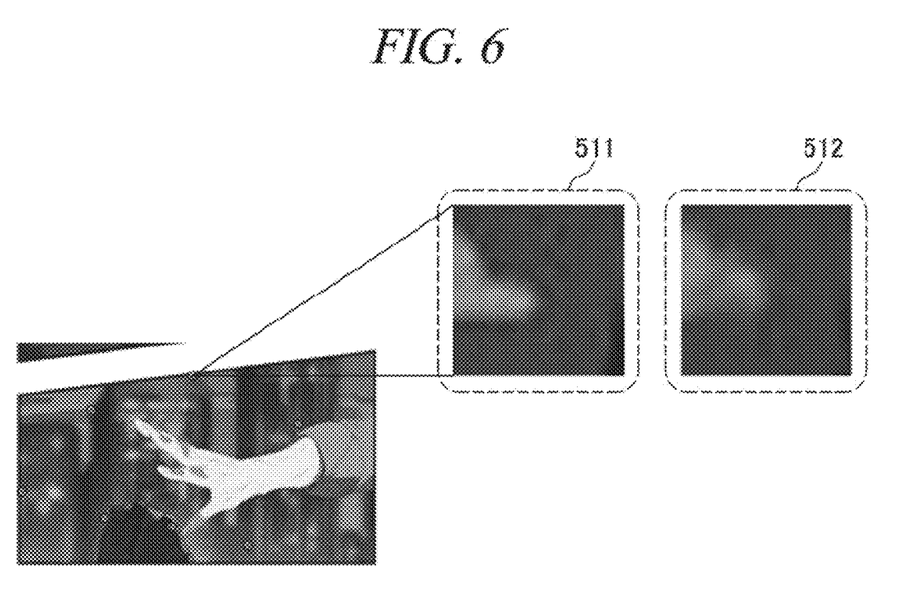
FIG. 6 is an exemplary view in which an identification code is inserted by converting an image of the insertion region according to an example of the present disclosure.

FIG. 6 is an exemplary view in which an identification code is inserted by converting the image 500 of the insertion region according to an example of the present disclosure.

Referring to FIG. 6, in the original insertion region 510 in which the image 500 is not converted, an original region 511 and a transformed region 512 in which the binary code is changed to insert the identification code may be identified.

Since the transformed region 512 that is transformed from the image 500 has a very small size, it is difficult to distinguish it with the naked eye of a general person.

Therefore, tracking may be made easier because there is a high probability that a person who attempts to illegally copy or steal will pass it.

An example of the present disclosure may also be implemented in a form of a recording medium including instructions executable by a computer, such as a program module executed by a computer. Computer-readable medium may be arbitrary available medium that may be accessed by a computer, and includes volatile and nonvolatile medium, removable and non-removable medium. Further, the computer-readable medium may include a computer storage medium. The computer-readable medium includes all volatile and nonvolatile, removable and non-removable media implemented in any method or technology for storage of information such as computer readable instructions, data structures, program modules, or other data.

Although the method and the system of the present disclosure are described in connection with specific examples, some or all of their configuration elements or operations may be implemented by using a computer system having a general-purpose hardware architecture.

The above description of the present disclosure is for illustrative purposes only, and those of ordinary skill in the art to which the present disclosure pertains will be able to understand that other specific forms may be easily modified without changing the technical spirit or essential features of the present disclosure. Therefore, it should be understood that the examples described above are illustrative and non-limiting in all respects. For example, each configuration element described as a single type may be implemented in a distributed manner, and similarly, the configuration elements described as being distributed may also be implemented in a combined form.

The scope of the present disclosure is indicated by the claims to be described later rather than the detailed description, and all changes or modified forms derived from the meaning and scope of the claims and their equivalent concepts should be interpreted as being included in the scope of the present disclosure.

What is claimed is:

1. A method of providing identification code insertion service for tracking a duplicated image, which is performed by a server, comprising:
   (a) receiving an image from a user terminal;
   (b) converting the received image to black and white, and selecting a plurality of insertion regions in the converted image;
   (c) transforming an image of at least one of a plurality of insertion regions selected at random; and
   (d) mapping an identification code and image information included in the transformed image of the insertion region, storing the identification code and the image information in a database, and providing the image in which the identification code is inserted, to the user terminal,
   wherein the insertion region refers to a region constituted of at least one pixel among pixels constituting the image, and
   wherein the identification code is generated by transforming a binary code of a predetermined size included in a finally selected insertion region.

2. The method of providing identification code insertion service for tracking a duplicated image according to claim 1, wherein the server calculates an image regions having a binary value larger than a predetermined binary value through an edge detection algorithm.

3. The method of providing identification code insertion service for tracking a duplicated image according to claim 2, wherein the insertion region is selected excluding an image region including characters.

4. The method of providing identification code insertion service for tracking a duplicated image according to claim 3, wherein positions, binary codes, and sizes of a plurality of the insertion regions are temporarily stored, and the positions of the plurality of the insertion regions are set based on coordinates of x and y axes.

5. The method of providing identification code insertion service for tracking a duplicated image according to claim 1, wherein, before the (c) step, a method of generating the identification code includes,
   (c-1) generating a copy image by copying the image of the insertion region which is finally selected;
   (c-2) generating an image of the identification code including an arbitrary random number, according to a predetermined image generation algorithm, wherein the image of the identification code has more higher than the predetermined similarity compared to the copy image; and
   (c-3) storing a position into which the image of the identification code is inserted, a binary code, and a size thereof, and wherein the position of the identification code is set based on the coordinates of the x and y axes, and the size thereof matches with the size of a selected final insertion region.

6. The method of providing identification code insertion service for tracking a duplicated image according to claim 5, wherein in the (c-2) step, an image generated by a user is replaced with the image of the identification code.

7. The method of providing identification code insertion service for tracking a duplicated image according to claim 1, wherein in the (c) step, the identification code is inserted after deleting the image of the insertion region finally selected by mapping to the position and size of the identification code.

8. The method of providing identification code insertion service for tracking a duplicated image according to claim 1, wherein the image information includes at least one or more of a unique identifier, a title, related image information, an image generation time, and personal information of a producer included in the image.

9. The method of providing identification code insertion service for tracking a duplicated image according to claim 1, after the (d) step, further comprising:
receiving identification information of an arbitrary terminal or user account information associated with the arbitrary terminal when a signal for copying a specific image is issued from the arbitrary terminal;
storing the identification information of the arbitrary terminal or the user account information associated with the specific image;
receiving an arbitrary image from unauthorized external server and external terminal, and determining whether an identification code extracted from the arbitrary image matches with an identification code of a specific image stored in advance; and
when the identification code extracted from the arbitrary image matches with the identification code of a specific image, notifying a predetermined manager terminal of a matching result by considering the identification information or the user account information of the terminal associated with the specific image according to the matching result as a replication target provided.

10. An apparatus of providing identification code insertion service for tracking a duplicated image, comprising:
a memory in which a program that provides the identification code insertion service for tracking the duplicated image is stored; and
a processor that executes a program stored in the memory to provide the identification code insertion service for tracking the duplicated image,
wherein the processor receives an image from a user terminal; converts the received image to black and white, and selects a plurality insertion regions in the converted image; transforms an image of at least one of a plurality of insertion regions selected at random; and maps an identification code and image information included in the transformed image of the insertion region, stores the identification code and the image information in a database, and provides the image into which the identification code is inserted, to the user terminal.

* * * * *